United States Patent [19]

Dwyer

[11] 4,032,097
[45] June 28, 1977

[54] NESTABLE POT STANDS

[76] Inventor: Thomas H. Dwyer, 3711 Roswell Road, Suite 255, Atlanta, Ga. 30342

[22] Filed: July 26, 1976

[21] Appl. No.: 708,589

[52] U.S. Cl. .................................. 248/146; 211/71; 248/175

[51] Int. Cl.² ...................... A47F 7/00; A47G 29/00

[58] Field of Search .................. 248/146, 175, 176; 220/23.6; 206/514, 515, 501; 108/91; 211/181, 71

[56] References Cited

UNITED STATES PATENTS

| 844,175 | 2/1907 | McIntyre | 248/146 |
|---|---|---|---|
| 1,342,807 | 6/1920 | Harrington | 248/146 X |

FOREIGN PATENTS OR APPLICATIONS 634,861  3/1928  France .................................. 108/91

Primary Examiner—J. Franklin Foss
Attorney, Agent, or Firm—Patrick F. Henry

[57] ABSTRACT

A plurality of individual pot stands which have support rings of substantially identical size and construction but each having three legs of different lengths than the legs on the other stands. The stands may be nested and stacked together by placing the rings on top of each other and supporting the whole assembly on the stand with the longest legs. Individually the stands may be used to support pots and the like as a double-boiler, for cooling a pot or for warming the pot from a flame beneath like a chafing dish.

2 Claims, 4 Drawing Figures

NESTABLE POT STANDS

BACKGROUND OF THE INVENTION

1. FIELD OF THE INVENTION

Cooking utensils and especially pot supports.

2. DESCRIPTION OF THE PRIOR ART

The usual support for a heated pot is a piece of insulated material or ceramic placed on a counter. Other types of pot supports and stands are of a fixed height and intended primarily for a specific use such as a serving dish with an alcohol lamp beneath such as chafing dishes. The conventional type of double-boiler arrangement comprises two separate individual pots, one inserted inside the other. The present device provides an arrangement of pot supports which may be nested together and easily stored for use but which provide a choice of different heights for different purposes.

SUMMARY OF THE INVENTION

A plurality of individual pot stands each comprising a circular ring and each having several legs of the same size on each stand but of different sizes for the different stands whereby the rings will stack and the legs fit thereover.

An object of this invention is to provide nestable pot stands which can be used for a plurality of different purposes and which have different heights to support pots.

An advantage of the present invention is found in the construction whereby support rings of the same approximate diameter, resembling piston rings, may be stacked together for easy storage and subsequent use.

Another object of the present invention is to provide a plurality of such stands which can be selected according to height and used for double-boiler arrangements, warming dishes and other purposes.

Other and further objects and advantages of this invention will become apparent upon reading the following description of a preferred embodiment taken in conjunction with the accompanying drawings.

DESCRIPTION OF A PREFERRED EMBODIMENT

Figure 1:
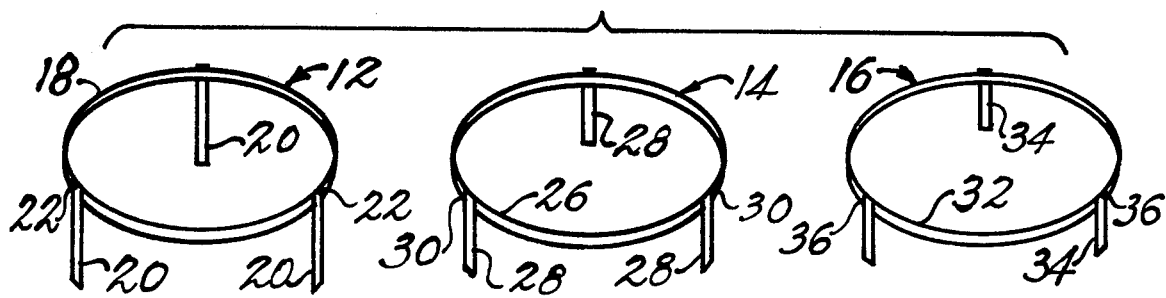
FIG. 1 is a perspective view of three of the pot stands separated from each other.
Figure 2:
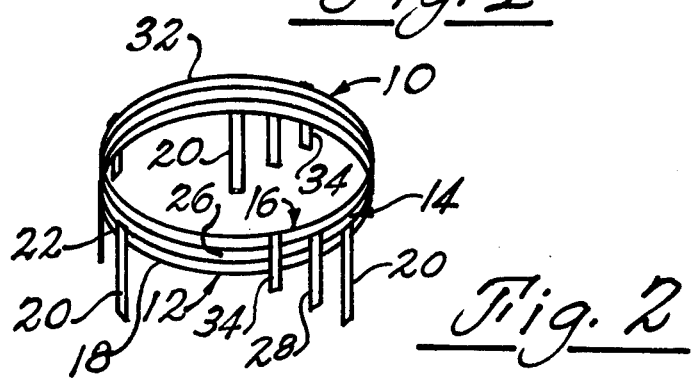
FIG. 2 is a perspective view of the three pot stands of FIG. 1 nested and stacked together for storage.

In FIG. 2 there is shown an assembly of nested or stacked stands designed in overall assembly by reference numeral 10 and each comprising one of the stands shown in FIG. 1 respectively designated by reference numerals 12, 14 and 16.

Each of the stands 12, 14 and 16 are of substantially identical construction differing with respect to the heights of the legs. Thus, stand 12 comprises a metal ring, resembling an ordinary piston ring, which serves as a support for a pot or the like and which has three legs 20 attached thereto as by welding at the respective points 22. Stand 14 comprises an identical ring as stand 12 designated generally by reference numeral 26 and having thereto respective legs 28 welded in place at points 30. Stand 16 comprises a ring 32 having legs 34 welded thereto at points 36.

Figure 3:
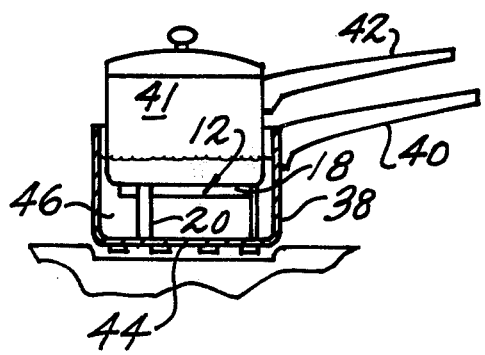
FIG. 3 is a side elevation view of a double-boiler arrangement having the lower pot broken away to show one of the present stands.
Figure 4:
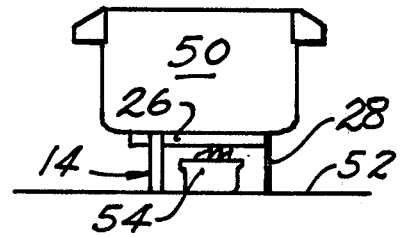
FIG. 4 is a side elevation view of one of the stands in FIG. 1 supporting a pot with an alcohol burner therebeneath.

Each of the rings 18, 26 and 32 are of identical construction and size but the legs 20, 28 and 34 differ as to length so that each of the respective rings 18, 26 and 32 are supported at a different height as will appear in FIGS. 2, 3 and 4.

Referring to FIG. 2, it is seen that the respective rings 18, 26 and 32 may be stacked in engagement one on top of the other with the stand 12 being the lowermost and supporting the entire assembly on its legs 20 and with the other legs 28 and 34 being respectively outside of the respective rings 18 and 26.

In the arrangement shown in FIG. 3 there is a double-boiler comprising a larger bottom, boiler pot 38 having a handle 40 and a smaller upper pot 41 having a handle 42. Pot 38 supports on the bottom 44 thereof the pot stand 12 shown in FIG. 1 which has the respective legs 20 resting on the bottom 44 of the lower pot 38. The upper pot 41 is supported on the support ring 18 so as to be within the water 46 that is inside pot 38. One of the other stands 14 or 16 could be used in the arrangment in FIG. 3 in place of stand 12.

In the arrangement shown in FIG. 4, one of the stands 14 of FIG. 1 is illustrated supporting a pot 50 on a table surface 52 on which there is an alcohol burner 54 in the manner and style of a chafing dish.

While I have shown and described a particular embodiment of this invention this is by way of illustration only and does not constitue any sort of limitation on the scope of the invention since various alterations, changes, deviations, eliminations, substitutions, revisions, omissions and departures may be made in the embodiment shown without departing from the scope of this invention as defined by the appended claims.

What is claimed:

1. In a pot stand arrangement: a plurality of individual pot stands each comprising a circular support ring, and all of said support rings being of substantially the same diameter, each of said pot stands having a plurality of support legs mounted on the outside thereof and the legs of one stand being longer than the legs of any other stand, said pot stands being stackable with the support rings of one stand on top of another and with the stand having the longest legs being the lowermost stand and any other stand having the legs thereof outside of and extending down the outside of the ring of said lowermost stand, the inside surfaces of all legs on a stand being included in a cylindrical plane of larger diameter than the diameter of the rings whereby the legs of one ring fit outside the ring of another stand.

2. The stand in claim 1 wherein each ring has three legs equally spaced from each other around the respective ring.

* * * * *